United States Patent
Ushiyama et al.

(10) Patent No.: US 10,649,426 B2
(45) Date of Patent: May 12, 2020

(54) MOTOR CONTROL DEVICE, CONTROL METHOD, INFORMATION PROCESSING PROGRAM AND RECORDING MEDIUM

(71) Applicant: OMRON Corporation, Kyoto (JP)

(72) Inventors: Takao Ushiyama, Ritto (JP); Satoshi Yamawaki, Ritto (JP); Takaya Kitano, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/384,246

(22) Filed: Dec. 19, 2016

(65) Prior Publication Data

US 2017/0261955 A1    Sep. 14, 2017

(30) Foreign Application Priority Data

Mar. 10, 2016    (JP) ................................. 2016-047563

(51) Int. Cl.
*G05B 19/042* (2006.01)
*H02P 29/00* (2016.01)
*G05B 19/414* (2006.01)
*H02P 29/02* (2016.01)

(52) U.S. Cl.
CPC ....... *G05B 19/042* (2013.01); *G05B 19/0421* (2013.01); *G05B 19/4144* (2013.01); *H02P 29/00* (2013.01); *H02P 29/02* (2013.01); *G05B 2219/34231* (2013.01)

(58) Field of Classification Search
CPC ...... G05B 19/042; G05B 19/414; H02P 29/00
See application file for complete search history.

(56) References Cited

U.S. PATENT DOCUMENTS

| 2012/0217921 A1* | 8/2012 | Wu ........................ G01R 31/04 318/490 |
| 2012/0249025 A1* | 10/2012 | Okita ....................... H02P 6/18 318/400.02 |
| 2014/0097859 A1* | 4/2014 | Matsumura .......... G01R 31/041 324/750.01 |
| 2014/0333233 A1 | 11/2014 | Zeng |

(Continued)

FOREIGN PATENT DOCUMENTS

| EP | 2958229 | 12/2015 |
| JP | 2002023802 | 1/2002 |
| JP | 2004-312894 | 11/2004 |

(Continued)

OTHER PUBLICATIONS

"Search Report of Europe Counterpart Application", dated Jul. 28, 2017, p. 1-p. 8, in which the listed references were cited.

(Continued)

*Primary Examiner* — Jorge L Carrasquillo
*Assistant Examiner* — Said Bouziane
(74) *Attorney, Agent, or Firm* — JCIPRNET

(57) ABSTRACT

The present invention can stabilize driving of a motor even if multiple control instructions of driving the motor are acquired through non-real-time communication. A servo driver (10) does not perform processing corresponding to other control commands when acquiring the other control commands from other interfaces through non-real-time communication in a process of performing processing corresponding to a control command acquired via one interface and through non-real-time communication.

11 Claims, 7 Drawing Sheets

(56) References Cited

U.S. PATENT DOCUMENTS

2014/0364213 A1* 12/2014 Matsushita ......... G07F 17/3213
463/31

FOREIGN PATENT DOCUMENTS

| JP | 2005316880 | | 11/2005 |
|---|---|---|---|
| JP | 2005316880 A | * | 11/2005 |
| JP | 2014220999 | | 11/2014 |
| JP | 2015-176319 | | 10/2015 |
| JP | 2016019374 | | 2/2016 |

OTHER PUBLICATIONS

"Office Action of China Counterpart Application," dated Jan. 2, 2019, with English translation thereof, p. 1-p. 18.
"Office Action of Japan Counterpart Application", dated Sep. 4, 2018, with English translation thereof, p. 1-p. 13.

* cited by examiner

List of control commands
(control instructions)

- Parameter
- Status
- Commissioning
  :

FIG. 3(a)

Details of a commissioning
command

- Access right
- Servo ON
- JOG
- PTP
- FFT
  :

FIG. 3(b)

Command case

| Address | Command | Content |
|---|---|---|
| 1000Hex | Access right | 0: Release |
| | | 1: Get |
| 1001Hex | Servo ON | 0: Servo OFF |
| | | 1: Servo ON |
| 1002Hex | JOG | 0: Stop |
| | | 1: Start |

| | | (A) Control instruction (including servo ON) under real-time communication | |
|---|---|---|---|
| | | Presence | Absence |
| (B) Access right get command (including its control command/information) via an upper communication port | | ×<br>Not accept | ○<br>Accept |
| (C) Access right get command (including its control command/information) via a tool port | | ×<br>Not accept | ○<br>Accept |

FIG. 4(b)

| | | (B) The control instruction via an upper communication port is an access right get state | (C) The control instruction via a tool port is an access right get state |
|---|---|---|---|
| (A) Control instruction under real-time communication | | ×<br>Not accept | ×<br>Not accept |
| (B) Control instruction (control command/information) via an upper communication port | Commissioning | ○<br>Accept | ×<br>Not accept |
| | Beyond Commissioning | ○<br>Accept | ○<br>Accept |
| (C) Control instruction (control command/information) via a tool port | Commissioning | ×<br>Not accept | ○<br>Accept |
| | Beyond Commissioning | ○<br>Accept | ○<br>Accept |

MOTOR CONTROL DEVICE, CONTROL METHOD, INFORMATION PROCESSING PROGRAM AND RECORDING MEDIUM

CROSS-REFERENCE TO RELATED APPLICATION

This application claims the priority benefit of Japanese application serial no. 2016-047563, filed on Mar. 10, 2016. The entirety of the above-mentioned patent application is hereby incorporated by reference herein and made a part of this specification.

BACKGROUND OF THE INVENTION

1. Field of the Invention

The present invention relates to a control device that controls driving of a motor such as a servo motor.

2. Description of Related Art

A servo driver has been known before, which can perform processing corresponding to a control instruction acquired through non-real-time communication. Moreover, a control system of a servo motor where this servo driver communicates with various external devices is known.

For example, Patent Document 1 in the following discloses a motor control device, and a control system communicating with a motor control device console that displays a motor driving condition of the motor control device. Also, Patent Document 2 discloses a servo motor driver, and a control system communicating with a Programmable Logic Controller (PLC) connected with an external information processing device such as a PLC device via a network. That is, a servo driver including multiple communication interfaces is known.

PRIOR ART DOCUMENT

Patent Documents

Patent Document 1: Japanese Patent Publication Gazette No. 2004-312894 (published on Nov. 4, 2004)
Patent Document 2: Japanese Patent Publication Gazette No. 2015-176319 (published on Oct. 5, 2015)

SUMMARY OF THE INVENTION

Problem to be Solved in the Invention

However, the prior arts as described above have the following problems: in the case that a servo driver acquires multiple control commands through non-real-time communication via multiple communication interfaces respectively, the multiple control commands conflict, and driving of the motor may become unstable. For example, in the case that the multiple control commands include commands of driving the motor, in the prior arts, the commands of driving the motor may conflict with each other, resulting in that the motor behaves unstably. Moreover, for example, when the motor is driven based on a control command, the behavior of the motor may become unstable in the case that a control parameter of the servo driver is rewritten based on other control commands.

The present invention is accomplished in view of the problem, directed to achieving a motor control device and the like, such that the driving of the motor may not become unstable even if in the case that multiple control commands are acquired through non-real-time communication.

Technical Means of Solving the Problem

To solve the problem, the motor control device of the present invention performs processing corresponding to a control instruction from an external apparatus, wherein the motor control device includes: multiple interfaces from which the control instruction is input; and a control portion that performs processing corresponding to the control instruction, the control portion including: an acquisition portion that acquires the control instruction via the multiple interfaces respectively; a command processing portion that performs processing corresponding to a control instruction acquired through non-real-time communication in the control instruction acquired by the acquisition portion, i.e., a control command; and an exclusive limiting portion that performs an excluding action when the command processing portion performs processing corresponding to a predetermined control command acquired by the acquisition portion via one of the interfaces and the acquisition portion acquires other control commands from the other interfaces, wherein the excluding action limits the command processing portion to perform processing corresponding to the other control commands.

According to the structure, the exclusive limiting portion performs an excluding action when the command processing portion performs processing corresponding to the predetermined control command acquired through the non-real-time communication and the acquisition portion acquires other control commands from the other interfaces, wherein the excluding action limits the command processing portion to perform processing corresponding to the other control commands.

Therefore, the motor control device produces the following effect: the motor can be driven stably even if the multiple control commands are sequentially acquired through the non-real-time communication via the multiple interfaces respectively. For example, the motor control device produces the following effect: the behaviour of the motor can be prevented from becoming unstable even if the multiple control commands sequentially acquired via the multiple interfaces respectively conflict.

The motor control device of the present invention may also be as follows: the predetermined control command corresponding to the processing performed by the command processing portion includes a command of controlling driving of a motor.

According to the structure, the exclusive limiting portion performs an excluding action when the command processing portion performs processing corresponding to the predetermined control command including a command of controlling driving of the motor and the acquisition portion acquires other control commands from the other interfaces, wherein the excluding action limits the command processing portion to perform processing corresponding to the other control commands.

Therefore, when the motor control device performs processing corresponding to the predetermined control command including a command of controlling driving of the motor, an excluding action is performed and the excluding action limits execution of processing corresponding to the other control commands acquired from the other interfaces, and thus the following effect is produced: the behaviour of the motor can be prevented from becoming unstable.

The motor control device of the present invention may also be as follows: the other control commands include the command of controlling driving of the motor.

According to the structure, the exclusive limiting portion performs an excluding action when the command processing portion performs processing corresponding to the predetermined control command acquired through the non-real-time communication and the acquisition portion acquires the other control commands including a command of controlling driving of the motor from the other interfaces, wherein the excluding action limits the command processing portion to perform processing corresponding to the other control commands.

Therefore, the motor control device, when performing processing corresponding to the predetermined control command, limits execution of processing corresponding to the other control commands including a command of controlling driving of the motor, and thus the following effect is produced: the behaviour of the motor can be prevented from becoming unstable.

The motor control device of the present invention may also be as follows: the exclusive limiting portion does not perform the excluding action when at least one of the predetermined control command corresponding to the processing performed by the command processing portion and the other control commands does not include the command of controlling driving of the motor.

According to the structure, the exclusive limiting portion does not perform the excluding action when at least one of the predetermined control command corresponding to the processing performed by the command processing portion and the other control commands does not include the command of controlling driving of the motor.

Therefore, the motor control device produces the following effects: processing of driving the motor can be performed, and processing corresponding to a control instruction (control command) not including a command of controlling driving of the motor such as data items of physical quantity data acquired from the driven motor and setting of an acquisition condition can be performed at the same time. Moreover, the motor control device produces the following effects: processing corresponding to a control instruction (control command) not including a command of controlling driving of the motor such as data items of physical quantity data acquired from the driven motor and setting of an acquisition condition can be performed, and processing of driving the motor can be performed at the same time. That is, the motor control device, for example, produces the following effects: adjustment on multi-axis parameters can be performed, and a single-axis commissioning action can be performed at the same time.

The motor control device of the present invention may also be as follows: the multiple interfaces include: a first communication interface via which the control instruction from an upper controller is input, the upper controller being the external apparatus communicably connected with the device via a network; and a second communication interface via which the control instruction from an external device as the external apparatus not connected to the network is input, the acquisition portion acquires the control instruction through the non-real-time communication via at least one of the first communication interface and the second communication interface.

According to the structure, the motor control device produces the following effect: processing corresponding to a control instruction (control command) acquired through non-real-time communication via at least one of the first communication interface and the second communication interface can be performed without making driving of the motor unstable.

The motor control device of the present invention may also be as follows: the acquisition portion distinguishes the control instruction acquired via the first communication interface from the control instruction acquired via the second communication interface.

According to the structure, the motor control device produces the following effect: the control instruction (control command) acquired via the first communication interface and the control instruction (control command) acquired via the second communication interface can be distinguished.

The motor control device of the present invention may also be as follows: the predetermined control command corresponding to the processing performed by the command processing portion includes a command of causing the exclusive limiting portion to start the excluding action and a command of causing the exclusive limiting portion to end the excluding action, the exclusive limiting portion starts the excluding action when the acquisition portion acquires the command of causing the exclusive limiting portion to start the excluding action included in the predetermined control command, and ends the excluding action when the acquisition portion acquires the command of causing the exclusive limiting portion to end the excluding action included in the predetermined control command.

According to the structure, the exclusive limiting portion starts the excluding action when the acquisition portion acquires the command of starting the excluding action, and ends the excluding action when the acquisition portion acquires the command of ending the excluding action.

Therefore, the motor control device produces the following effect: the excluding action started by acquiring a command of starting the excluding action can be ended by acquiring a command of ending the excluding action.

The motor control device of the present invention may also be as follows: the exclusive limiting portion ends the excluding action when the acquisition portion acquires the predetermined control command corresponding to the processing performed by the command processing portion for a specified period of time.

According to the structure, the exclusive limiting portion ends the excluding action when the acquisition portion acquires the predetermined control command corresponding to the processing performed by the command processing portion for a specified period of time.

Therefore, the motor control device produces the following effect: the excluding action can be ended when the predetermined control command corresponding to the processing performed is acquired for a specified period of time.

The motor control device of the present invention may also be as follows: the exclusive limiting portion performs an excluding action when the command processing portion performs processing corresponding to the predetermined control command, wherein the excluding action limits execution of processing corresponding to a control instruction acquired by the acquisition portion through cyclic communication via one of the multiple interfaces.

According to the structure, the exclusive limiting portion limits execution of processing corresponding to the control instruction acquired through the cyclic communication in a period when the control command acquired through the non-real-time communication is being performed.

Therefore, the motor control device produces the following effect: the motor can be driven stably even if the control instruction is acquired through the cyclic communication in a period when processing corresponding to the control command acquired through the non-real-time communication is performed.

The motor control device of the present invention may also be as follows: the exclusive limiting portion performs an excluding action when the acquisition portion acquires the predetermined control command via one of the interfaces in a status that the device does not power on the motor, wherein the excluding action limits the command processing portion to perform processing corresponding to the other control commands acquired by the acquisition portion from the other interfaces subsequently.

According to the structure, the exclusive limiting portion performs an excluding action when the acquisition portion acquires the predetermined control command via one of the interfaces in a status that the device does not power on the motor, wherein the excluding action limits the command processing portion to perform processing corresponding to the other control commands acquired by the acquisition portion from the other interfaces subsequently.

Therefore, the motor control device produces the following effect: processing corresponding to the other control commands acquired from the other interfaces subsequently can be performed when the predetermined control command is acquired via one of the interfaces in a status that the device does not power on the motor. That is, the motor control device produces the following effect: whether it is necessary to perform an excluding action is determined according to whether the motor is during power-on (whether the servo is ON or OFF); specifically, the excluding action can be performed when the motor is not powered on (the servo is OFF).

Herein, when the motor is during power-on (the servo is ON), the motor is in a status of being actually driven or a preliminary action status of to be actually driven, or in a status that it may not rotate even if a shaft is rotated with hands. Therefore, the following effect is produced: in "a status that the motor is not during power-on", that is, in a status (that is, a status that the motor will rotate if a shaft is rotated with hands) that the motor is not driven (or a preliminary action status of not to be driven), an excluding action can be performed when a control command is acquired from one of the interfaces, the excluding action being excluding execution of processing corresponding to the control commands from the other interfaces.

The motor control device of the present invention may also be as follows: the exclusive limiting portion performs an excluding action when the acquisition portion acquires the predetermined control command via one of the interfaces in a status that the driving of the motor stops, wherein the excluding action limits the command processing portion to perform processing corresponding to the other control commands acquired by the acquisition portion from the other interfaces subsequently.

According to the structure, the exclusive limiting portion performs an excluding action when the acquisition portion acquires the predetermined control command via one of the interfaces in a status that the driving of the motor stops, wherein the excluding action limits the command processing portion to perform processing corresponding to the other control commands acquired by the acquisition portion from the other interfaces subsequently.

Therefore, the motor control device produces the following effect: execution of processing corresponding to the other control commands acquired from the other interfaces subsequently can be limited when the predetermined control command is acquired via one of the interfaces in a status that the driving of the motor stops. That is, the motor control device produces the following effect: although the motor is during power-on, when the motor is in a stop status, processing corresponding to the control command acquired via one of the interfaces can be performed, and execution of processing corresponding to the other control commands acquired from the other interfaces can be performed at the same time.

The motor control device of the present invention may also be as follows: the exclusive limiting portion performs an excluding action when the acquisition portion acquires the predetermined control command via one of the interfaces in a status that a driving speed of the motor is less than a specified value, wherein the excluding action limits the command processing portion to perform processing corresponding to the other control commands acquired by the acquisition portion from the other interfaces subsequently.

According to the structure, the exclusive limiting portion performs an excluding action when the acquisition portion acquires the predetermined control command via one of the interfaces in a status that a driving speed of the motor is less than a specified value, wherein the excluding action limits the command processing portion to perform processing corresponding to the other control commands acquired by the acquisition portion from the other interfaces subsequently.

Therefore, the motor control device produces the following effect: when the predetermined control command is acquired via one of the interfaces in a status that a driving speed of the motor is less than a specified value, execution of processing corresponding to the other control commands acquired from the other interfaces subsequently can be limited.

The motor control device of the present invention may further include: a notification portion that notifies a user about at least one of information indicating that the excluding action has been performed and information related to an acquisition source of the control instruction corresponding to the processing performed by the command processing portion.

According to the structure, the notification portion notifies a user about at least one of information indicating that the excluding action has been performed and information related to an acquisition source of the control instruction corresponding to the processing performed by the command processing portion.

Therefore, the motor control device produces the following effect: when the excluding action is performed, a user can be notified about at least one of information indicating that the excluding action has been performed and information related to an acquisition source of the control instruction corresponding to the processing performed.

To solve the problem, the control method of the present invention is a control method of a motor control device which performs processing corresponding to a control instruction from an external apparatus and includes multiple interfaces from which the control instruction is input, wherein the control method includes: an acquisition step of acquiring the control instruction via the multiple interfaces; a command processing step of performing processing corresponding to a control instruction acquired through non-real-time communication in the control instruction acquired in the acquisition step, i.e., a control command; and an exclusive limiting step of performing an excluding action when processing corresponding to a predetermined control command acquired in the acquisition step via one of the interfaces is performed in the command processing step and other control commands are acquired from the other interfaces, wherein the excluding action limits execution of processing corresponding to the other control commands.

According to the method, the exclusive limiting step is performing an excluding action when processing corresponding to the predetermined control command acquired through the non-real-time communication is performed in the command processing step and other control commands are acquired from the other interfaces in the acquisition step, wherein the excluding action limits execution of processing corresponding to the other control commands in the command processing step.

Therefore, the control method produces the following effect: the motor can be driven stably in the case that the multiple control commands are sequentially acquired through the non-real-time communication via the multiple interfaces respectively. For example, the control method produces the following effect: the behaviour of the motor can be prevented from becoming unstable in the case of the multiple control commands sequentially acquired via the multiple interfaces respectively conflict.

Effect of the Invention

The present invention produces the following effect: the driving of the motor may not become unstable even if multiple control instructions of driving the motor are acquired through non-real-time communication.

BRIEF DESCRIPTION OF THE DRAWINGS

FIG. 3(a) to FIG. 3(c) are diagrams that describe a hierarchical structure and the like of commands acquired by the servo driver in FIG. 1.

FIG. 4(a) and FIG. 4(b) are diagrams that describe a profile of exclusive control processing performed by the servo driver in FIG. 1.

DESCRIPTION OF THE EMBODIMENTS

[Embodiment 1]

Embodiment 1 of the present invention is described in details below based on FIG. 1 to FIG. 7. Description about the same symbols marked for the same or equivalent parts in the figures is not repeated. To facilitate understanding of a servo driver 10 (motor control device) according to an aspect of the present invention, a profile of a control system 1 including the servo driver 10 is described with FIG. 2 at first. In addition, an example in which the motor control device according to an aspect of the present invention is a servo driver is described below, but the motor control device according to an aspect of the present invention is not necessarily a servo driver. Even if an inverter is used as the motor control device according to an aspect of the present invention, it is also applicable to the present invention.

(Profile of the Control System of Embodiment 1)

Figure 2:
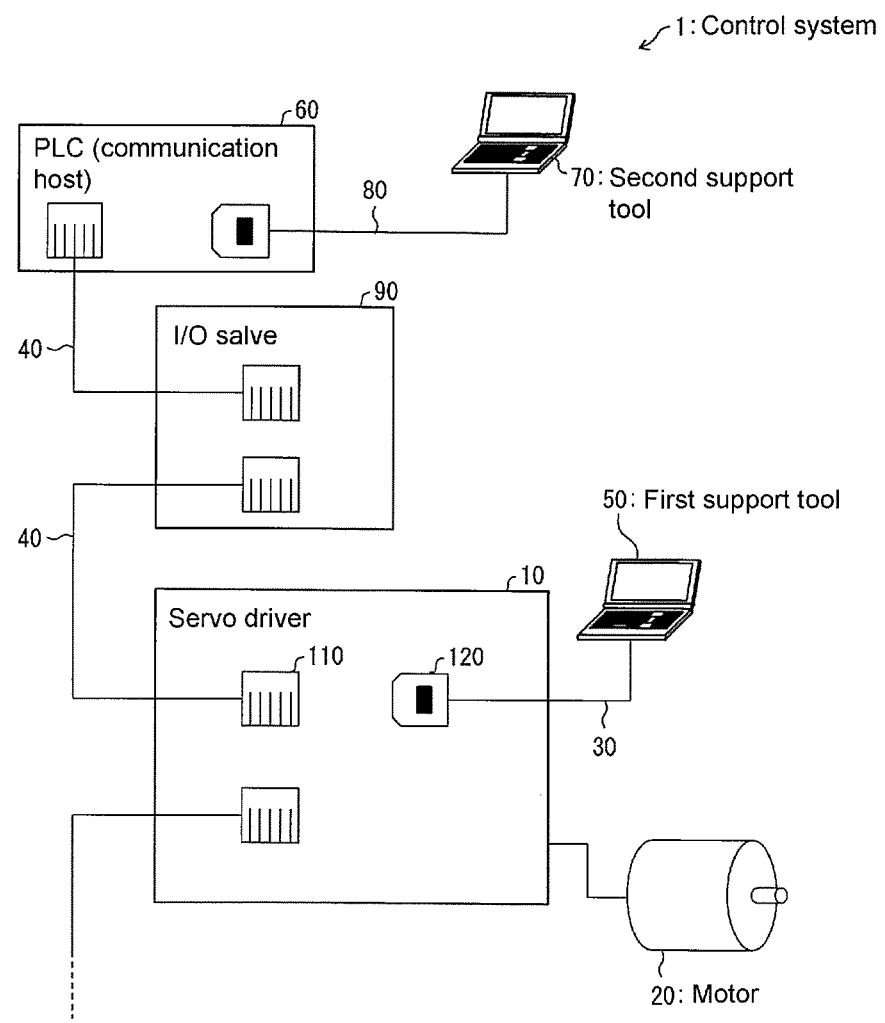
FIG. 2 is a diagram of an overall profile of a control system according to the present embodiment.

FIG. 2 is a diagram of a profile of the control system 1 including the servo driver 10. As shown in FIG. 2, the control system 1 includes a servo driver 10, a motor 20, a first support tool 50, a programmable logic controller (PLC) 60 and a second support tool 70.

In the control system 1, the servo driver 10 is connected with the motor 20 via a dedicated cable. Moreover, the first support tool 50, for example, is connected to the servo driver 10 via a communication cable 30 that serves as a Universal Serial Bus (USB) cable. Then, the PLC 60 is connected to the servo driver 10 via a field network 40. The second support tool 70, for example, is connected to the PLC 60 via a communication cable 80 that serves as a USB cable.

The PLC 60 is a programmable controller that performs a user program for controlling a control apparatus such as the motor 20. In the control system 1, the PLC 60 is referred to as "master device" based on the meaning of managing data transmission via the field network 40. On the other hand, the servo driver 10 (and an I/O slave 90) is referred to as "slave device". That is, the control system 1 is a master-slave control system, the master-slave control system including: a PLC 60 serving as a master device; and more than one servo driver 10 (and I/O slave 90) serving as a slave device, which are connected to the master device via a network (field network 40). As the field network 40, as described later, for example, an Ethernet for Control Automation Technology (EtherCAT) (registered trademark) can be used.

The PLC 60 as the master device can conduct real-time communication and non-real-time communication with the servo driver 10 via the field network 40. Especially in the case that the EtherCAT (registered trademark) is used as the field network 40, real-time communication refers to process data communication (cyclic communication), and non-real-time communication refers to message communication. The so-called "process data communication" refers to communication that uses process data objects (PDO) exchanging real-time information at a fixed cycle. The so-called "information communication" refers to communication that uses service data objects (SDO) transferring information with any timing. Besides, in the following description, "process data communication (cyclic communication)" is sometimes abbreviated as "PDO communication". Moreover, "information communication" is sometimes abbreviated as "SDO communication". PDO communication is real-time communication (cyclic communication), and in contrast, SDO communication is non-real-time communication.

Details are stated later, the PLC 60, via the field network 40, sends a control instruction as an execution result of the PLC 60 for a user program to the servo driver 10 through PDO communication serving as real-time communication (cyclic communication). Moreover, the PLC 60, via the field network 40, sends a control command (control instruction) corresponding to a user operation accepted by the second support tool 70 connected to the PLC 60 via the communication cable 80 to the servo driver 10 through the SDO communication serving as non-real-time communication.

The second support tool 70 is an information processing device for setting various parameters for the control system 1. The second support tool 70 sets and adjusts a control parameter stored in the servo driver 10 via the PLC 60 and the field network 40. Moreover, the second support tool 70 accepts a user operation that intends to control driving of the motor 20 and the like. The control parameter to be set/ adjusted by the second support tool 70 and a control command (control instruction) corresponding to the user operation accepted by the second support tool 70 are sent to the servo driver 10 by the PLC 60 through SDO communication as non-real-time communication via the field network 40.

The second support tool 70 typically includes a general-purpose computer. For example, an information processing program performed by the second support tool 70 may also be stored in a compact disk-read only memory (CD-ROM) not shown for circulation. The program stored in the CD-ROM is read by a CD-ROM driving device and stored in a hard disk of the second support tool 70 and the like. Alternatively, it may also be constructed as that a program is downloaded from an upper host computer or the like via the network. Besides, in consideration of maintenance, a computer used as the second support tool 70 is preferably a note type personal computer with excellent portability.

The field network 40 transmits various data transmitted and received between the servo driver 10 and the PLC 60. That is, the field network 40 transmits various data received by the PLC 60 or sent by the PLC 60. As the field network 40, various industrial Ethernets (registered trademark) can be used typically. As the industrial Ethernets (registered trademark), for example, EtherCAT (registered trademark), Profinet Isochronous Real Time (Profinet IRT), MECHATROLINK (registered trademark)-III, Powerlink, Serial Real Time Communication Specification (SERCOS) (registered trademark)-III, Common Industrial Protocol Motion (CIP Motion) and the like are known, and any of these can also be used. Then, field networks other than the industrial Ethernets (registered trademark) may also be used. For example, in the case that motion control is not made, a DeviceNet, a CompoNet/Internet Protocol (CompoNet/IP) and the like (registered trademark) may also be used. In the control system of the present embodiment, the structure when the EtherCAT (registered trademark) typically employed as the industrial Ethernet (registered trademark) is used as the field network 40 is illustrated. In addition, in the following description, to make comparison with the communication via the communication cable 30 as a lower communication network, the field network 40 is sometimes referred to as "upper bus (upper communication network)".

In addition, as shown in FIG. 2, an I/O slave 90 may also be configured on the field network 40 connecting the servo driver 10 and the PLC 60. However, in the control system 1, the I/O slave 90 is not necessary.

The control instruction as an execution result of the PLC 60 for the user program is transmitted to the servo driver 10 via the field network 40 through the PDO communication as real-time communication. The control command (control instruction) corresponding to the user operation accepted by the second support tool 70 is transmitted to the servo driver 10 (by the PLC 10) through the SDO communication as non-real-time communication via the field network 40. That is, the servo driver 10, via the field network 40, receives the control instruction as an execution result of the PLC 60 for the user program through the PDO communication as real-time communication. Moreover, the servo driver 10, via the field network 40, receives the control command (control instruction) corresponding to the user operation accepted by the second support tool 70 through the SDO communication as non-real-time communication.

The servo driver 10 is a control device of the motor 20. The servo driver 10, via the field network 40, receives a control instruction (i.e., the control instruction as an execution result of the PLC 60 for the user program) of the PLC 60 from the PLC 60 through the PDO communication as real-time communication. Moreover, the servo driver 10 can drive the motor 20 according to the control instruction from the PLC 60 received through the PDO communication via the field network 40. For example, the servo driver 10 receives instruction values such as a position instruction value, a speed instruction value and a torque instruction value from the PLC 60 at a fixed cycle. Moreover, the servo driver acquires measured values related to actions of the motor 20 such as position, speed (typically calculated according to a difference between the position and the previous position) and torque from a detector connected to the shaft of the motor 20 such as a position sensor (rotary encoder) and a torque sensor. Moreover, the servo driver 10 sets the instruction value from the PLC 60 as a target value, and uses the measured value as a feedback value for feedback control. That is, the servo driver 10 adjusts a current for driving the motor 20, to make the measured value approach the target value. In addition, the servo driver 10 is sometimes also referred to as servo motor amplifier.

The servo driver 10 further, via the field network 40, receives the control command (control instruction) corresponding to the user operation accepted by the second support tool 70 from the PLC 60 through the SDO communication as non-real-time communication. Moreover, the servo driver 10 can drive the motor 20 according to the control command (control instruction) corresponding to the user operation accepted by the second support tool 70 through the SDO communication via the field network 40.

That is, the servo driver 10, for example, conducts communication with the PLC 60 via the field network 40 as the EtherCAT. The servo driver 10 receives the control command (control instruction) corresponding to the user operation accepted by the second support tool 70 from the PLC 60 through the SDO communication as non-real-time communication, and sends data requested by the PLC 60 to the PLC 60. Moreover, the servo driver 10 sends the data to the PLC 60 at a specified cycle through the PDO communication as real-time communication.

The servo driver 10 then, via the communication cable 30, receives a control command (control instruction) corresponding to a user operation accepted by the first support tool 50 from the first support tool 50 through non-real-time communication. Moreover, the servo driver 10 can drive the motor 20 according to the control command (control instruction) corresponding to the user operation accepted by the first support tool 50 received through non-real-time communication via the communication cable 30.

The first support tool 50 is an information processing device for setting various parameters for the control system 1. The first support tool 50 is connected with the servo driver 10 through the communication cable 30, and sets and adjusts the control parameter stored in the servo driver 10. Moreover, the first support tool 50 accepts a user operation that intends to control driving of the motor 20 and the like. The control parameter to be set/adjusted by the first support tool 50, and the control command (control instruction) corresponding to the user operation accepted by the first support tool 50 are output to the servo driver 10 through non-real-time communication via the communication cable 30. The servo driver 10 stores the control parameter set and adjusted by the first support tool 50, and drives the motor 20 according to the control parameter. Moreover, the servo driver 10 can drive the motor 20 according to the control command (control instruction) corresponding to the user operation accepted by the first support tool 50.

The first support tool 50, like the second support tool 70, typically includes a general-purpose computer. For example, an information processing program performed by the first support tool 50 may also be stored in a compact disk-read only memory (CD-ROM) not shown for circulation. The program stored in the CD-ROM is read by a CD-ROM driving device and stored in a hard disk of the first support tool 50 and the like. Alternatively, it may also be constructed as that a program is downloaded from an upper host computer or the like via the network. Besides, in consideration of maintenance, a computer used as the first support tool 50 is preferably a note type personal computer with excellent portability.

In addition, in the following, sometimes the control instruction acquired from the PLC 60 (i.e., the control instruction as an execution result of the PLC 60 for the user program) by the servo driver 10 through real-time communication (PDO communication) via the field network 40 is referred to as "(A) control instruction under real-time communication". Moreover, sometimes the control instruction acquired from the PLC 60 (i.e., the control instruction corresponding to the user operation accepted by the second support tool 70) by the servo driver 10 through non-real-time communication (SDO communication) via the field network 40 is referred to as "(B) control command (control instruction) via an upper communication port". Then, sometimes the control instruction acquired from the first support tool 50 (i.e., the control instruction corresponding to the user operation accepted by the first support tool 50) by the servo driver 10 through non-real-time communication via the communication cable 30 is referred to as "(C) control command (control instruction) via a tool port".

As described above, in the control system 1, the servo driver 10 can control driving of the motor 20 based on control instructions (control commands) acquired from the following paths respectively.

Firstly, the servo driver 10, via the field network 40, receives a control instruction as an execution result of the PLC 60 for a user program through PDO communication as real-time communication, and can control the driving of the motor 20 based on the control instruction. That is, the servo driver 10 can control the driving of the motor 20 based on (A) the control instruction under real-time communication.

Secondly, the servo driver 10, via the field network 40, receives a control command (control instruction) corresponding to a user operation accepted by the second support tool 70 from the PLC 60 through SDO communication as non-real-time communication, and can control the driving of the motor 20 based on the control command. That is, the servo driver 10 can control the driving of the motor 20 based on (B) the control command (control instruction) via an upper communication port.

Thirdly, the servo driver 10, via the communication cable 30, receives control command (control instruction) corresponding to a user operation accepted by the first support tool 50 from the first support tool 50 through non-real-time communication, and can control the driving of the motor 20 based on the control command. That is, the servo driver 10 can control the driving of the motor 20 based on (C) the control command (control instruction) via a tool port.

In the control system 1, in the case that the parameter of the servo driver 10 is to be adjusted, the user can adjust the parameter by using the first support tool 50, and can also adjust the parameter by using the second support tool 70. Also, the user can instruct a control command corresponding to processing of driving the motor 20 to the servo driver 10 by using the first support tool 50, and can also instruct it to the servo driver 10 by using the second support tool 70.

The servo driver 10, when receiving a control command including a command of controlling driving of the motor 20 (e.g., a command of driving the motor 20) from the first support tool 50 and the second support tool 70 via non-real-time communication, makes exclusive control between multiple control commands received sequentially, to eliminate a situation where the motor 20 performs unexpected actions.

In addition, as the control command including a command of controlling driving of the motor 20, for example, a "commissioning" control command, a "Fast Fourier Transform (FFT) (frequency characteristic measurement)" control command, and a "general output acknowledgment (output ON/OFF function)" control command can be listed. As the "output ON/OFF function", "brake ON/OFF" can be listed.

In the control system 1, "a control command including a command of controlling driving of the motor 20" requiring exclusive control, by being set as "a control command (function) requiring an access right", is distinguished from "a control command not including a command of controlling driving of the motor 20" not requiring exclusive control. Details are described later.

(Regarding the Servo Driver)

So far, the profile of the control system 1 and the devices (the servo driver 10, the motor 20, the first support tool 50, the PLC 60 and the second support tool 70) included in the control system 1 is described with FIG. 2. Next, contents of the structure and processing of the servo driver 10 included in the control system 1 are described with FIG. 1. Before details of the servo driver 10 are described with reference to FIG. 1, the profile of the servo driver 10 is sorted as follows so as to facilitate understanding of the servo driver 10.

(Profile of the Servo Driver)

The servo driver 10 is a motor control device that performs processing corresponding to a control instruction from an external device (the first support tool 50, the PLC 60 and the second support tool 70), and includes multiple interfaces (an upper communication portion 110 and a tool communication portion 120) from which the control instruction is input and a control portion 100 that performs processing corresponding to the control instruction. The control portion 100 includes: an acquisition portion 101 that acquires the control instruction via the multiple interfaces respectively; a motor control portion 104 (command processing portion) that performs processing corresponding to a control instruction in the control instruction acquired by the acquisition portion 101 and acquired through non-real-time communication, i.e., a control command; and an access right control portion 102 (exclusive limiting portion) that performs an excluding action when the motor control portion 104 performs processing corresponding to a predetermined control command acquired by the acquisition portion 101 via one of the interfaces (the upper communication portion 110 or tool communication portion 120) and when the acquisition portion 101 acquires other control commands from other interfaces (the tool communication portion 120 or upper communication portion 110), wherein the excluding action limits the motor control portion 104 to perform processing corresponding to the other control commands.

According to the structure, the access right control portion 102 performs an excluding action when the motor control portion 104 performs processing corresponding to the predetermined control command acquired through the non-real-time communication via one of the interfaces (the upper communication portion 110 or tool communication portion 120) and when the acquisition portion 101 acquires other control commands from other interfaces (the tool communication portion 120 or upper communication portion 110), wherein the excluding action limits the motor control portion 104 to perform processing corresponding to the other control commands.

Specifically, the access right control portion 102 performs an excluding action when the motor control portion 104 performs processing corresponding to the predetermined control command acquired from the upper communication portion 110 through the non-real-time communication and when the acquisition portion 101 acquires other control commands from the tool communication portion 120, wherein the excluding action limits the motor control portion 104 to perform processing corresponding to the other control commands.

Moreover, the access right control portion 102 performs an excluding action when the motor control portion 104 performs processing corresponding to the predetermined control command acquired from the tool communication portion 120 through the non-real-time communication and when the acquisition portion 101 acquires other control commands from the upper communication portion 110, wherein the excluding action limits the motor control portion 104 to perform processing corresponding to the other control commands.

Therefore, the servo driver 10 produces the following effect: the motor 20 can also be driven stably even if the multiple control commands are sequentially acquired through the non-real-time communication via the multiple interfaces (the upper communication portion 110 and the tool communication portion 120). For example, the servo driver 10 produces the following effect: the behaviour of the motor 20 can be prevented from becoming unstable even if the multiple control commands sequentially acquired via the multiple interfaces respectively conflict.

In the servo driver 10, the multiple interfaces include: an upper communication portion 110 (first communication interface) via which the control instruction from the PLC 60 (upper controller) is input, the PLC 60 (upper controller) being the external apparatus communicably connected with the device via a field network 40 (network); and a tool communication portion 120 (second communication interface) via which the control instruction from a first support tool 50 (external device) is input, wherein the first support tool 50 (external device) is the external apparatus not connected to the field network 40, and the acquisition portion 101 acquires the control instruction through the non-real-time communication via at least one of the upper communication portion 110 and the tool communication portion 120.

According to the structure, the servo driver 10 produces the following effect: processing corresponding to the control instruction (control command) acquired through non-real-time communication via at least one of the upper communication portion 110 and the tool communication portion 120 can be performed without making the driving of the motor 20 unstable.

In the servo driver 10, the acquisition portion 101 distinguishes the control instruction acquired via the upper communication portion 110 from the control instruction acquired via the tool communication portion 120.

According to the structure, the servo driver 10 produces the following effect: the control instruction (control command) acquired via the upper communication portion 110 and the control instruction (control command) acquired via the tool communication portion 120 can be distinguished.

In the servo driver 10, the access right control portion 102 performs an excluding action when the motor control portion 104 performs processing corresponding to the predetermined control command, and the excluding action limits processing corresponding to the control instruction acquired by the acquisition portion 101 through cyclic communication (PDO communication) via the upper communication portion 110.

According to the structure, the access right control portion 102 limits execution of processing corresponding to the control instruction acquired through the cyclic communication (PDO communication) via the upper communication portion 110 in a period when the control command acquired through the non-real-time communication is being performed. Specifically, the access right control portion 102 limits execution of processing corresponding to the control instruction acquired from the PLC 60 (the field network 40) through the cyclic communication (PDO communication) via the upper communication portion 110 in a period when the control command acquired through the non-real-time communication is being performed.

Therefore, the servo driver 10 produces the following effect: the motor 20 can be driven stably even if the control instruction is acquired through the cyclic communication (PDO communication) in a period when processing corresponding to the control command acquired through the non-real-time communication is performed.

(Details of the Servo Driver)

For the servo driver 10 whose profile has been described above, details of the structure of the servo driver 10 are described in the following.

Figure 1:
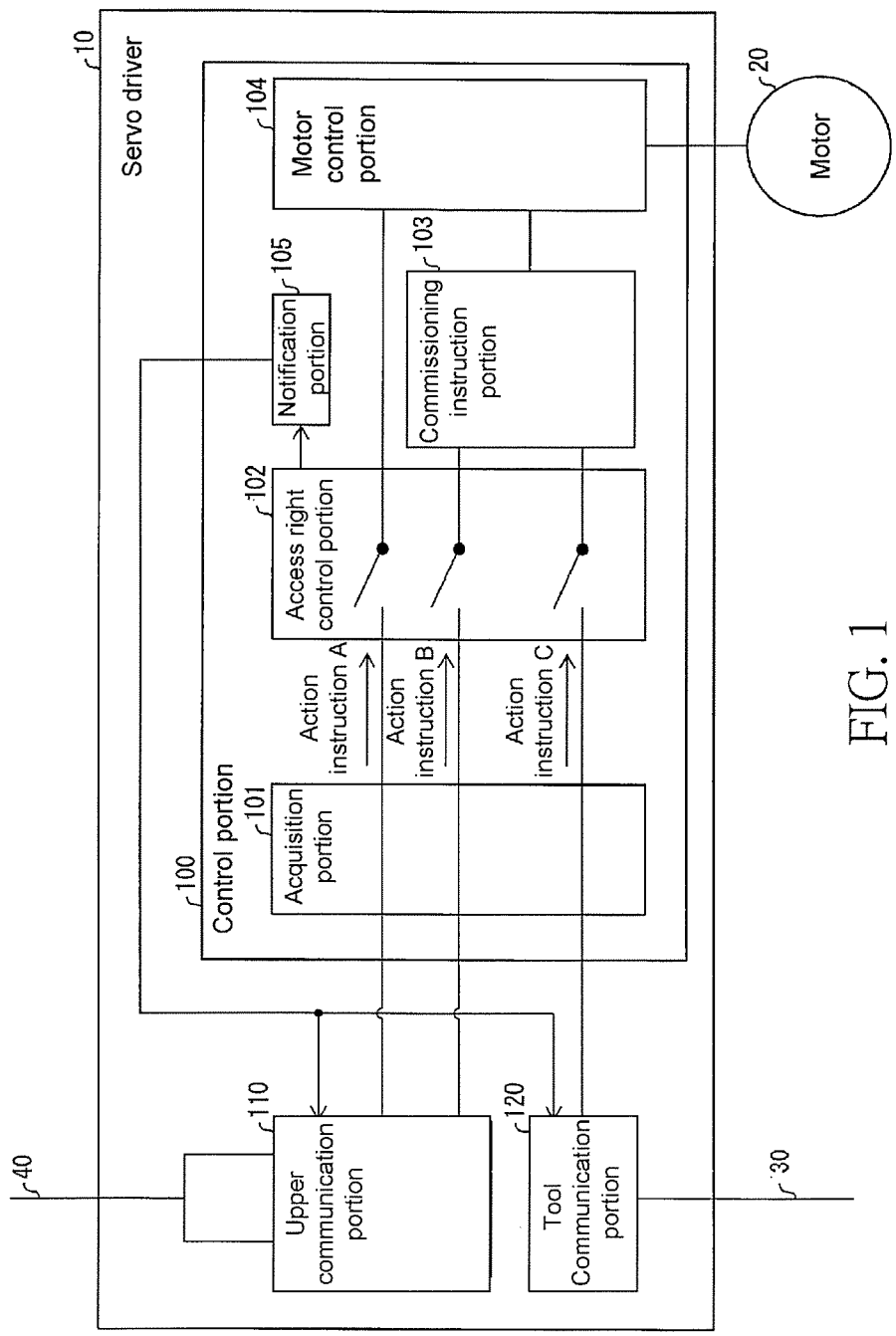
FIG. 1 is a structural block diagram of main parts of a servo driver according to Embodiment 1 of the present invention.

FIG. 1 is a structural block diagram of main parts of the servo driver 10. The servo driver 10 shown in FIG. 1 is a structure including a control portion 100, an upper communication portion 110, and a tool communication portion 120. In addition, to ensure conciseness of the disclosure, structures not directly related to the present embodiment are omitted from the description and the block diagram. However, according to an actual condition of implementation, the servo driver 10 may also include the omitted structures.

The upper communication portion 110 conducts communication with the PLC 60 via the field network 40. The upper communication portion 110, via the field network 40, conducts PDO communication as real-time communication and SDO communication as non-real-time communication with the PLC 60. The upper communication portion 110, via the field network 40, receives a control instruction for controlling the motor 20 by the servo driver 10 from the PLC 60.

The upper communication portion 110, via the field network 40, receives, from the PLC 60, a control instruction as an execution result of the PLC 60 for a user program through PDO communication. That is, the upper communication portion 110, via the field network 40, receives, from the PLC 60, (A) a control instruction under real-time communication.

Moreover, the upper communication portion 110, via the field network 40, receives, from the PLC 60, a control instruction corresponding to a user operation accepted by the second support tool 70 connected to the PLC 60 through SDO communication as non-real-time communication. That is, the upper communication portion 110, via the field network 40, receives, from the PLC 60, (B) a control command (control instruction) via an upper communication port.

The upper communication portion 110 outputs the control instruction received from the PLC 60 via the field network 40 to the acquisition portion 101. That is, the upper communication portion 110 outputs (A) the control instruction under real-time communication and (B) the control command (control instruction) via an upper communication port received from the PLC 60 via the field network 40 to the acquisition portion 101.

The tool communication portion 120 conducts communication with the first support tool 50 via the communication cable 30. The communication between the tool communication portion 120 and the first support tool 50 via the communication cable 30 is non-real-time communication. The tool communication portion 120, via the communication cable 30, receives, from the first support tool 50, a control instruction corresponding to a user operation accepted by the first support tool 50 through non-real-time communication. That is, the tool communication portion 120, via the communication cable 30, receives, from the first support tool 50, (C) a control command (control instruction) via a tool port. The tool communication portion 120 outputs (C) the control command (control instruction) via a tool port received from the first support tool 50 via the communication cable 30 to the acquisition portion 101.

The control portion 100 uniformly controls the functions of the servo driver 10. In the control portion illustrated, an acquisition portion 101, an access right control portion 102, a commissioning instruction portion 103, a motor control portion 104 and a notification portion 105 are included as function blocks.

The acquisition portion 101 acquires, from the upper communication portion 110, (A) the control instruction under real-time communication and (B) the control command (control instruction) via an upper communication port, and receives, from the tool communication portion 120, (C) the control command (control instruction) via a tool port. That is, the acquisition portion 101 acquires "(A) the control instruction under real-time communication", "(B) the control command (control instruction) via an upper communication port" and "(C) the control command (control instruction) via a tool port".

The acquisition portion 101 outputs (A) the control instruction under real-time communication acquired from the upper communication portion 110, (B) the control command (control instruction) via an upper communication port acquired from the upper communication portion 110 and (C) the control command (control instruction) via a tool port acquired from the tool communication portion 120 to the access right control portion 102.

Herein, the acquisition portion 101 can distinguish acquisition sources of the acquired control commands (control instructions), that is, can distinguish the upper communication portion 110 from the tool communication portion 120. In addition, as stated above, the control instruction received by the upper communication portion 110 through PDO communication (real-time communication) is (A) the control instruction under real-time communication. The control command (control instruction) received by the upper communication portion 110 through SDO communication (non-real-time communication) is (B) the control command (control instruction) via an upper communication port. The control command (control instruction) received by the tool communication portion 120 through non-real-time communication is (C) the control command (control instruction) via a tool port.

In the case that the acquisition portion 101 sequentially acquires multiple control commands (control instructions), the access right control portion 102 performs an excluding action for respective execution of the multiple control commands (control instructions). That is, in the case that the acquisition portion 101 sequentially acquires (A) the control instruction under real-time communication, (B) the control command (control instruction) via an upper communication port and (C) the control command (control instruction) via a tool port, for the execution thereof, the access right control portion 102 performs an excluding action.

For example, in a period when the motor control portion 104 performs processing corresponding to (B) the control command (control instruction) via an upper communication port acquired by the acquisition portion 101 and when the acquisition portion 101 acquires (C) the control command (control instruction) via a tool port, the access right control portion 102 performs an excluding action and the excluding action limits the motor control portion 104 to perform processing corresponding to (C) the control command (control instruction) via a tool port.

Herein, especially, the access right control portion 102 excludes a predetermined control command, but does not exclude control commands other than the predetermined control command. The access right control portion 102, for example, excludes control commands including a command of driving the motor 20, but does not exclude control commands not including the command of driving the motor 20.

Specifically, the access right control portion 102 performs an excluding action in the case that (B) the control command (control instruction) via an upper communication port and (C) the control command (control instruction) via a tool port both include a command of controlling driving of the motor 20, and the excluding action limits the motor control portion 104 to perform processing corresponding to (C) the control command (control instruction) via a tool port.

That is, in the case that at least one of (B) the control command (control instruction) via an upper communication port and (C) the control command (control instruction) via a tool port does not include a command of controlling driving of the motor 20, the access right control portion 102 does not limit the motor control portion 104 to perform processing corresponding to (C) the control command (control instruction) via a tool port (does not perform an excluding action). Therefore, in a period when the motor control portion 104 performs processing corresponding to (B) the control command (control instruction) via an upper communication port acquired by the acquisition portion 101, the motor control portion 104 performs processing corresponding to (C) the control command (control instruction) via a tool port when the acquisition portion 101 acquires (C) the control command (control instruction) via a tool port. The motor control portion 104, for example, performs processing corresponding to (B) the control command (control instruction) via an upper communication port and processing corresponding to (C) the control command (control instruction) via a tool port at the same time.

Moreover, for example, in a period when the motor control portion 104 performs processing corresponding to (C) the control command (control instruction) via a tool port acquired by the acquisition portion 101, the access right control portion 102 performs an excluding action when the acquisition portion 101 acquires (B) the control command (control instruction) via an upper communication port, wherein the excluding action limits the motor control portion 104 to perform processing corresponding to (B) the control command (control instruction) via an upper communication port.

Herein, especially, the access right control portion 102 performs an excluding action when (B) the control command (control instruction) via an upper communication port and (C) the control command (control instruction) via a tool port both include a command of controlling driving of the motor 20, wherein the excluding action limits the motor control portion 104 to perform processing corresponding to (B) the control command (control instruction) via an upper communication port.

That is, in the case that at least one of (B) the control command (control instruction) via an upper communication port and (C) the control command (control instruction) via a tool port does not include a command of controlling driving of the motor 20, the access right control portion 102 does not limit the motor control portion 104 to perform processing corresponding to (B) the control command (control instruction) via an upper communication port (does not perform an excluding action). Therefore, in a period when the motor control portion 104 performs processing corresponding to (C) the control command (control instruction) via a tool port acquired by the acquisition portion 101, the motor control portion 104 performs processing corresponding to (B) the control command (control instruction) via an upper communication port when the acquisition portion 101 acquires (B) the control command (control instruction) via an upper communication port. The motor control portion 104, for example, performs processing corresponding to (B) the control command (control instruction) via an upper communication port and processing corresponding to (C) the control command (control instruction) via a tool port at the same time.

That is, the access right control portion 102 does not perform an excluding action in the case that at least one of the predetermined control command corresponding to the motor control portion 104 and the other control commands does not include a command of controlling driving of the motor 20.

According to the structure, the access right control portion 102 does not perform an excluding action in the case that at least one of the predetermined control command corresponding to the motor control portion 104 and the other control commands does not include a command of controlling driving of the motor 20.

Therefore, the servo driver 10 produces the following effects: processing of driving the motor 20 can be performed, and processing corresponding to a control instruction (control command) not including a command of controlling driving of the motor 20 such as data items of physical quantity data acquired from the driven motor 20 and setting of an acquisition condition can be performed at the same time. Moreover, the servo driver 10 produces the following effects: processing corresponding to a control instruction (control command) not including a command of controlling driving of the motor 20 such as data items of physical quantity data acquired from the driven motor 20 and setting of an acquisition condition can be performed, and processing of driving the motor 20 can be performed at the same time. That is, the servo driver 10, for example, produces the following effects: adjustment on multi-axis parameters can be performed, and a single-axis commissioning action can be performed at the same time.

As described above, the access right control portion 102 performs the excluding action in the case that (B) the control command acquired via the upper communication portion 110 and (C) the control command acquired via the tool communication portion 120 both include a command of driving the motor 20. That is, the motor control portion 104 is prevented from performing processing corresponding to (B) the control command acquired via the upper communication portion 110 (a control command including a command of driving the motor 20) and (C) the control command acquired via the tool communication portion 120 (a control command including a command of driving the motor 20) at the same time. Therefore, the servo driver 10 can also prevent the motor 20 from performing unexpected actions even if multiple control commands (control instructions) including a command of driving the motor 20 are acquired sequentially.

Moreover, the access right control portion does not exclude execution of processing corresponding to the control command not including the command of driving the motor 20. Therefore, the servo driver 10, for example, can perform processing corresponding to control commands (control commands of monitoring systems and parameter systems) not including the command of driving the motor 20 such as data items of physical quantity data of the motor 20/setting of an acquisition condition acquired by the servo driver 10.

Details of the excluding action performed by the access right control portion 102 are described later with FIG. 4(a), FIG. 4(b) and FIG. 5, but the access right control portion 102, for example, performs an excluding action with the following method. That is, for (A) the control instruction under real-time communication, (B) the control command (control instruction) via an upper communication port and (C) the control command (control instruction) via a tool port successively acquired by the acquisition portion 101, the access right control portion 102 does not send control commands (control instructions) limiting execution of corresponding processing to the commissioning instruction portion 103 (or the motor control portion 104), thus performing an excluding action.

The access right control portion 102, when performing the excluding action, notifies the notification portion 105 about the control commands (control instructions) limiting execution of corresponding processing. Moreover, the access right control portion 102, when performing the excluding action, notifies the notification portion 105 about control commands (control instructions) not limiting execution of corresponding processing, that is, control commands (control instructions) indicating that the motor control portion 104 performs corresponding processing.

The commissioning instruction portion 103 acquires, via the access right control portion 102, the control command acquired by the acquisition portion 101 through non-real-time communication. That is, the commissioning instruction portion 103 acquires, via the access right control portion 102, (B) the control command (control instruction) via an upper communication port and (C) the control command (control instruction) via a tool port. The commissioning instruction portion 103 converts the acquired control command to a signal (control instruction) that can be processed by the motor control portion 104 and output the signal to the motor control portion 104.

The motor control portion 104 acquires, via the access right control portion 102, the control command (control instruction) acquired by the acquisition portion 101. More accurately, the motor control portion 104, via the access right control portion 102, acquires (A) the control instruction under real-time communication acquired from the acquisition portion 101, and acquires (B) the control command (control instruction) via an upper communication port and (C) the control command (control instruction) via a tool port from the commissioning instruction portion 103. Moreover, the motor control portion 104 performs processing corresponding to the acquired control command (control instruction).

The notification portion 105 notifies a user about at least one of information indicating that the excluding action has been performed and information related to an acquisition source of the control instruction corresponding to the processing performed by the motor control portion 104 when the access right control portion 102 performs the excluding action.

Regarding a Hierarchical Structure of Control Instructions Acquired by the Servo Driver and the Like For the servo driver 10 details of the structure of which have been described above, exclusive control processing performed in the servo driver 10 is described below with FIG. 3(a) to FIG. 3(c) to FIG. 5. Firstly, the structure of the control instruction acquired by the servo driver 10 (especially the access right control portion 102) is described with FIG. 3(a) to FIG. 3(c).

FIG. 3(a) to FIG. 3(c) are diagrams that describe a hierarchical structure of control instructions (control commands) acquired by the servo driver 10. FIG. 3(a) is a diagram of an example of a control instruction (control command) acquired by the servo driver 10. As shown in FIG. 3(a), the control instructions (control commands) acquired by the servo driver 10 include control instructions (control commands) related to "parameter", control instructions (control commands) related to "status", control instructions (control commands) related to "commissioning" and the like.

FIG. 3(b) is a diagram of an example of a hierarchical structure of control instructions (control commands) related to "commissioning" so as to describe the hierarchical structure of the control instructions (control commands) acquired by the servo driver 10. As shown in FIG. 3(b), the control instructions (control commands) related to "commissioning" include an "access right (release/get)" command, a "servo (ON/OFF)" command, a "JOG (stop/start)" command, a "point to point (PTP)" command, a "FFT" command and so on.

FIG. 3(c) is a diagram that illustrates addresses and contents of the "access right (release/get)" command, the "servo (ON/OFF)" command and the "JOG (stop/start)" command includes in the control instructions (control commands) related to "commissioning". As shown in FIG. 3(b), the "access right" command is "address: 1000Hex", and the content includes "0: release" and "1: get".

As shown in FIG. 3(a) to FIG. 3(c), in the control system 1, a control command (e.g., a control command related to "commissioning") including a command of controlling driving of the motor 20 (e.g., a servo ON (servo OFF)" command) further includes an "access right (release/get)" command.

(Profile of Exclusive Control Processing)

Next, exclusive control processing performed by the servo driver 10 on more than two control instructions (control commands) having the structures described in FIG. 3(a) to FIG. 3(c) is described. In addition, as described later, the control instructions (control commands) on which the servo driver 10 performs exclusive control processing do not necessarily need to have the structures illustrated in FIG. 3(a) to FIG. 3(c). To facilitate understanding the processing performed by the servo driver 10, the processing performed by the servo driver 10 is sorted as follows at first.

That is, the exclusive control processing performed by the servo driver 10 is a control method of the server driver 10 (motor control device), and the servo driver 10 is a motor control device that performs processing corresponding to control instructions from external apparatuses (a first support tool 50, a PLC 60 and a second support tool 70), and has multiple interfaces (an upper communication portion 110 and a tool communication portion 120) from which the control instructions are input. The control method includes: an acquisition step of acquiring the control instruction via the multiple interfaces; a command processing step of performing processing corresponding to a control instruction in the control instruction acquired in the acquisition step and acquired through non-real-time communication, i.e., a control command; and an exclusive limiting step of performing an excluding action when processing corresponding to a predetermined control command acquired in the acquisition step via one of the interfaces is performed in the command processing step and when other control commands are acquired from the other interfaces, and the excluding action limits execution of processing corresponding to the other control commands.

According to the method, in the exclusive limiting step, an excluding action is performed when processing corresponding to the predetermined control command acquired through the non-real-time communication is performed in the command processing step and when the other control commands are acquired from the other interfaces in the acquisition step, and the excluding action limits execution of processing corresponding to the other control commands in the command processing step.

Therefore, the control method produces the following effect: the motor 20 can be driven stably even if the multiple control commands are acquired sequentially through the non-real-time communication via the multiple interfaces respectively. For example, the control method produces the following effect: the behavior of the motor 20 can be prevented from becoming unstable even if the multiple control commands acquired sequentially via the multiple interfaces respectively conflict.

(Details of the Exclusive Control Processing)

For the exclusive control processing performed by the servo driver 10 on the control instructions (control commands) having the structure illustrated in FIG. 3(a) to FIG. 3(c), details thereof are described below with FIG. 4(a), FIG. 4(b) and FIG. 5.

FIG. 4(a) and FIG. 4(b) are diagrams for describing a profile of the exclusive control processing performed by the servo driver 10. FIG. 4(a) is a diagram indicating "a relationship between presence/absence of (A) a control instruction under real-time communication and (B) an access right get command (including its control command/information) via an upper communication port" and "a relationship between presence/absence of (A) a control instruction under real-time communication and (C) an access right get command (including its control command/information) via a tool port".

In addition, in the following, the so-called "presence of a control instruction (control command)" refers to a status that the acquisition portion 101 has acquired the control instruction (control command) (especially a status that the motor control portion 104 performs processing corresponding to the control instruction (control command)).

As shown in FIG. 4(a), in the case of the presence of "(A) a control instruction under real-time communication", the servo driver 10 does not accept "(B) an access right get command (including its control command/information) via an upper communication port" and "(C) an access right get command (including its control command/information) via a tool port". That is, in the servo driver 10, in the case that "(A) a control instruction under real-time communication" gets an access right, the servo driver 10 does not accept "an access right get command (including its control command/information)" under non-real-time communication.

Moreover, in the case of the absence of "(A) a control instruction under real-time communication", the servo driver 10 accepts "(B) an access right get command (including its control command/information) via an upper communication port" and "(C) an access right get command (including its control command/information) via a tool port". That is, in the servo driver 10, in the case that "(A) a control instruction under real-time communication" does not get an access right, the servo driver 10 accepts "an access right get command (including its control command/information)" under non-real-time communication.

As described above, FIG. 4(a) indicates contents of exclusive control processing between a control instruction sent through real-time communication and a control command (control instruction) sent through non-real-time communication performed by the servo driver 10. On the other hand, FIG. 4(b) indicates contents of exclusive control processing between more than two control commands (control instructions) sent through non-real-time communication performed by the servo driver 10.

FIG. 4(b) indicates "in a status that (B) the control command via an upper communication port gets an access right, whether the servo driver 10 accepts (A) the control instruction under real-time communication, (B) the control command via an upper communication port and (C) the control command via a tool port".

Moreover, FIG. 4(b) indicates "in a status that (C) the control command via a tool port gets an access right, whether the servo driver 10 accepts (A) the control instruction under real-time communication, (B) the control command via an upper communication port and (C) the control command via a tool port".

As shown in FIG. 4(b), in a status that (B) the control command via an upper communication port gets an access right and in a status that (C) the control command via a tool port gets an access right, the servo driver 10 does not accept (A) the control instruction under real-time communication.

In a status that (B) the control command via an upper communication port gets an access right, the servo driver 10 accepts (B) the control command via an upper communication port whether the control command is a commissioning control command or a control command beyond commissioning. Moreover, in a status that (B) the control command via an upper communication port gets an access right, the servo driver 10 does not accept (C) the control command via a tool port in the case that the control command is a commissioning control command, but accepts it in the case that the control command is a control command beyond commissioning.

Herein, the so-called "in a status that (B) the control command via an upper communication port gets an access right", for example, refers to "a status that (B) the control command via an upper communication port includes an access right get command and processing corresponding to (B) the control command via an upper communication port is performed by the motor control portion 104". Moreover, as described with FIG. 3(a) to FIG. 3(c), the so-called control command including the "access right release/get" command, for example, refers to a command of controlling driving of the motor 20.

That is, in the servo driver 10, the predetermined control command (e.g., (B) the control command via an upper communication port that gets an access right in the example) corresponding to the processing performed by the motor control portion 104 includes a command of controlling driving of the motor 20 (e.g., a command of driving the motor 20).

According to the structure, the access right control portion 120 performs an excluding action when the motor control portion 104 performs processing corresponding to the predetermined control command including a command of controlling driving of the motor 20 and when the acquisition portion 101 acquires the other control commands from the other interfaces, and the excluding action limits the motor control portion 104 to perform processing corresponding to the other control commands.

Therefore, when the servo driver 10 performs processing corresponding to the predetermined control command including a command of controlling driving of the motor 20, an excluding action is performed, and the excluding action limits execution of processing corresponding to the other control commands acquired from the other interfaces, which thus produces the following effect: the behavior of the motor 20 can be prevented from becoming unstable.

In a status that (C) the control command via a tool port gets an access right, the servo driver 10 does not accept (B) the control command via an upper communication port in the case that the control command is a commissioning control command, but accepts it in the case that the control command is a control command beyond commissioning. Moreover, in a status that (C) the control command via a tool port gets an access right, the servo driver 10 accepts (C) the control command via a tool port whether the control command is a commissioning control command or a control command beyond commissioning.

That is, in the servo driver 10, the control command (which, for example, is (B) the control command via an upper communication port in a status that (C) the control command via a tool port gets an access right in the example) indicating that the access right control portion 102 limits execution of corresponding processing includes a command of controlling driving of the motor 20.

According to the structure, the access right control portion 120 performs an excluding action when the motor control portion 104 performs processing corresponding to the predetermined control command acquired through the non-real-time communication and when the acquisition portion 101 acquires the other control commands including a command of controlling driving of the motor 20 from the other interfaces, and the excluding action limits the motor control portion 104 to perform processing corresponding to the other control commands.

Therefore, in the case of performing processing corresponding to the predetermined control command, the servo driver 10 limits execution of processing corresponding to the other control commands including a command of controlling driving of the motor 20, which thus produces the following effect: the behavior of the motor 20 can be prevented from becoming unstable.

A specific example is described below with FIG. 5 for "exclusive control processing performed by the servo driver 10 on more than two control commands (control instructions)" of which the profile is sorted.

(Regarding the Specific Example of the Exclusive Control Processing)

Figure 5:
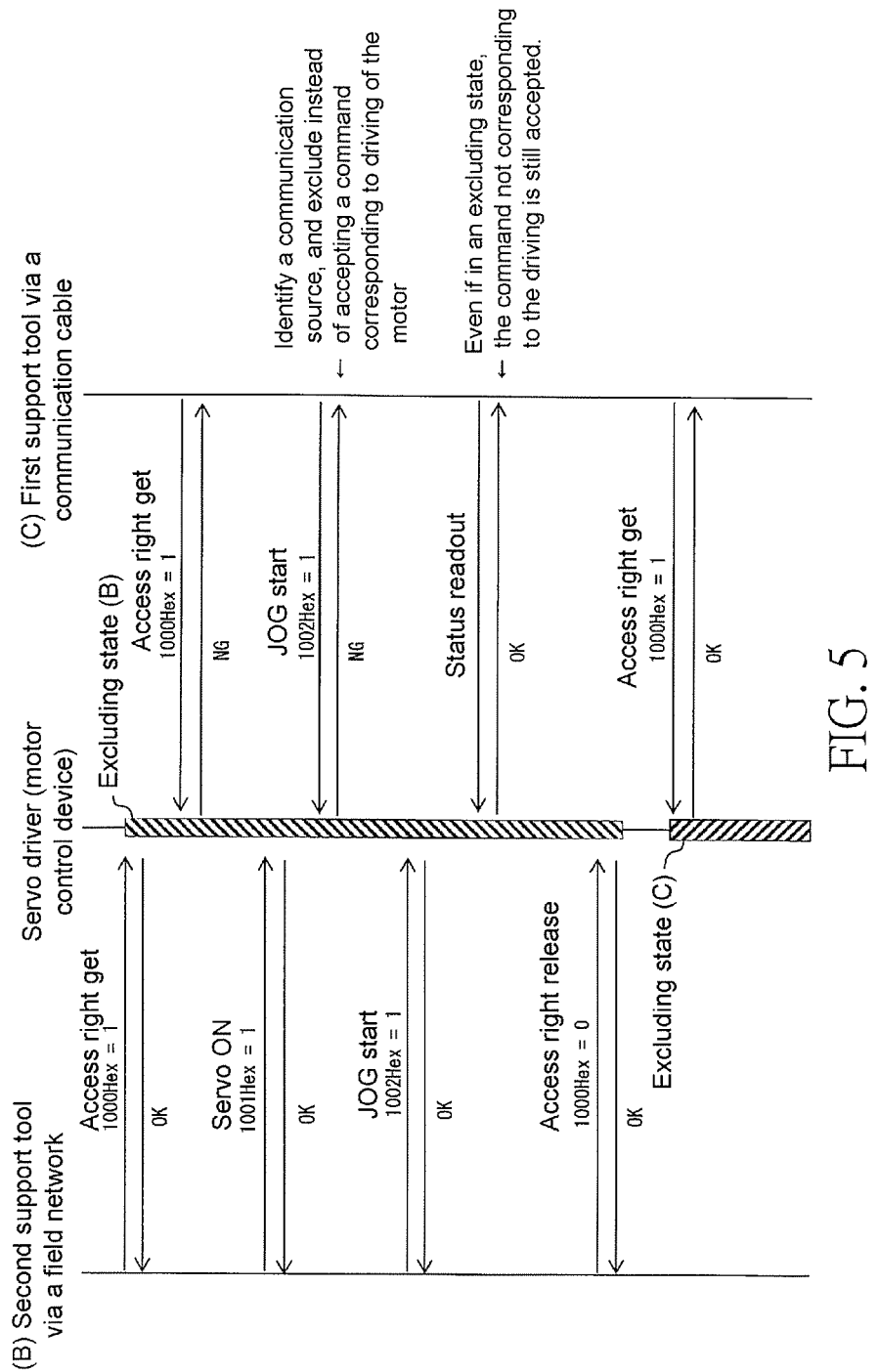
FIG. 5 is a sequence diagram of an example of exclusive control processing performed by the servo driver in FIG. 1.

FIG. 5 is a sequence diagram of an example of exclusive control processing performed by the servo driver 10. Specifically, in the case that control commands (control instructions) from (B) a second support tool 70 and (C) a first support tool 50 are sequentially sent to the servo driver 10 through non-real-time communication, an example of exclusive control processing performed by the servo driver 10 is illustrated in FIG. 5.

In addition, as described above, in the following description, "(A) the control instruction under real-time communication" also indicates a control instruction as an execution result of the PLC 60 for a user program. "(B) the control command (control instruction) via an upper communication port" indicates a control instruction corresponding to a user operation accepted by (B) the second support tool 70. "(C) the control command (control instruction) via a tool port" indicates a control instruction corresponding to a user operation accepted by (C) the first support tool 50.

That is, the servo driver 10, receives, via a communication cable 30, the control command (control instruction) from (C) the first support tool 50 through non-real-time communication. Moreover, the servo driver 10, receives, via a field network 40, the control command (control instruction) from (B) the second support tool 70 through non-real-time communication.

Moreover, in the example shown in FIG. 5, suppose that the control command (control instruction) from (B) the second support tool 70 received by the servo driver 10 is a control command related to "commissioning" ("commissioning" control command) described with FIG. 3(*a*) to FIG. 3(*c*). That is, suppose that the "commissioning" control command from (B) the second support tool 70 includes commands such as "access right get", "servo ON", "JOG start", . . . and "access right release".

When the access right control portion 102 of the servo driver 10 receives the "access right get" command (1000Hex=1) included in the "commissioning" control command from (B) the second support tool 70, an access right get status (excluding status) is judged. That is, the access right control portion 102 judges "whether it is a status that any of (A) the PLC 60, (B) the second support tool 70 and (C) the first support tool 50 gets an access right".

When judging that it is a status that "(A) the PLC 60, (B) the second support tool 70 and (C) the first support tool 50 all do not get an access right", the access right control portion 102 performs processing (OK) corresponding to the "access right get" command received from (B) the second support tool 70. That is, the access right control portion 102 assigns an access right to (B) the second support tool 70 ((B) the second support tool 70 gets an access right). Thus, the access right get status (excluding status) is changed into an excluding status (B), that is, changed into a status that (B) the second support tool 70 gets an access right.

In the excluding status (B), even if the acquisition portion 101 receives the "access right get" command (1000Hex=1) from (C) the first support tool 50, the access right control portion 102 does not perform processing (No Good, NG) corresponding to the "access right get" command received from (C) the first support tool 50.

Similarly, in the excluding status (B), even if the acquisition portion 101 receives the "JOG start" command (1002Hex=1) from (C) the first support tool 50, the access right control portion 102 does not performs processing (NG) corresponding to the"JOG start" command received from (C) the first support tool 50. In addition, the"JOG start" command (1002Hex=1) is an example of "the command of controlling driving of the motor 20".

That is, when the acquisition portion 101 receives a control instruction (control command), the access right control portion 102 identifies a communication source (source device) of the control instruction (control command) received by the acquisition portion 101, and acknowledges the access right get status. In the case that the control instruction (control command) received by the acquisition portion 101 is a control instruction (control command) from a device other than the device that gets an access right, the access right control portion 102 makes the following judgment. That is, the access right control portion 102 determines whether "the control instruction (control command) from a device other than the device that gets an access right" received by the acquisition portion 101 includes "a command of controlling driving of the motor 20" or "an access right get command".

In the case that "the control instruction (control command) from a device other than the device that gets an access right" includes "a command of controlling driving of the motor 20" or "an access right get command", the access right control portion 102 does not perform "the control instruction (control command) from a device other than the device that gets an access right". That is, the access right control portion 102 identifies the communication source, and excludes instead of accepting the command corresponding to driving of the motor.

In the excluding status (B), when the acquisition portion 101 receives a "servo ON" command (1001Hex=1) from (B) the second support tool 70, the access right control portion 102 performs processing (OK) corresponding to the "servo start" command received from (B) the second support tool 70.

In the excluding status (B), when the acquisition portion 101 receives a "JOG start" command (1002Hex=1) from (B) the second support tool 70, the access right control portion 102 performs processing (OK) corresponding to the "JOG start" command received from (B) the second support tool 70.

In the excluding status (B), when the acquisition portion 101 receives a "status readout" command from (C) the first support tool 50, the access right control portion 102 performs processing (OK) corresponding to the "status readout" command received from (C) the first support tool 50. In addition, the "status readout" command is not either of "the command of controlling driving of the motor 20" and "the access right get command".

That is, even if in the excluding status, the access right control portion 102 still accepts commands not corresponding to the driving. Specifically, even if the control instruction (control command) received by the acquisition portion 101 is "a control instruction (control command) from a device other than the device that gets an access right", if "the control instruction (control command) from a device other than the device that gets an access right" does not include "the command of controlling driving of the motor 20" and "the access right get command", the access right control portion 102 still performs "the control instruction (control command) from a device other than the device that gets an access right".

In the excluding status (B), when the acquisition portion 101 receives the "access right release" command (1000Hex=0) included in the control command related to "commissioning" from (B) the second support tool 70, the access right control portion 102 performs processing (OK) corresponding to the "access right release" command received from (B) the second support tool 70. Thus, the access right get status (excluding status) is changed from the excluding status (B) into a status that "the control instructions (control commands) from (A) the PLC 60, (B) the second support tool 70 and (C) the first support tool 50 respectively all do not get an access right".

When the acquisition portion 101 of the servo driver 10 receives the "access right get" command (1000Hex=1) included in the "commissioning" control command from (C) the first support tool 50 through non-real-time communication, the access right control portion 102 determines the access right get status (excluding status).

When determining that it is a status that "(A) the PLC 60, (B) the second support tool 70 and (C) the first support tool 50 all do not get an access right", the access right control portion 102 performs processing (OK) corresponding to the "access right get" command received from (C) the first support tool 50. That is, the access right control portion 102 assigns an access right to (C) the first support tool 50 ((C) the first support tool 50 gets an access right). Thus, the access right get status (excluding status) is changed into an excluding sate (C), that is, changed into a status that (C) the first support tool 50 gets an access right.

As described above, in the servo driver 10, the predetermined control command corresponding to the processing performed by the motor control portion 104 includes a command of causing the access right control portion 102 to start the excluding action and a command of causing the access right control portion 102 to end the excluding action, and the access right control portion 102 starts the excluding action when the acquisition portion 101 acquires the command of starting the excluding action included in the predetermined control command, and ends the excluding action when the acquisition portion 101 acquires the command of ending the excluding action included in the predetermined control command.

That is, the predetermined control command (e.g., the control command of controlling driving of the motor 20) includes an access right get command. When the acquisition portion 101 receives the access right get command, the access right control portion 102 determines "whether it is a status that any of (A) the PLC 60, (B) the second support tool 70 and (C) the first support tool 50 gets an access right". When determining that it is a status that "(A) the PLC 60, (B) the second support tool 70 and (C) the first support tool 50 all do not get an access right", the access right control portion 102 performs an excluding action. In addition, the excluding action performed through the access right get command, for example, is ended through the access right release command included in the predetermined control command.

According to the structure, the access right control portion 102 starts the excluding action when the acquisition portion 101 acquires the command of starting the excluding action, and ends the excluding action when the acquisition portion 101 acquires the command of ending the excluding action.

Therefore, the servo driver 10 produces the following effect: the excluding action started by acquiring a command of starting the excluding action can be ended by acquiring a command of ending the excluding action.

(Ending of Time Out-based Exclusive Control Processing)

In addition, the following example has been described so far, that is, by receiving an "access right release" command (1000Hex=0), the servo driver 10 changes from a status of getting an access right into a status of not getting an access right (a status that the access right is released).

However, in order to change from a status of getting an access right into a status of not getting an access right (a status that the access right is released), the servo driver 10 does not necessarily need to receive the "access right release" command (1000Hex=0). That is, the control instructions (control commands) indicating that the servo driver 10 performs exclusive control processing do not necessarily need to have the structures illustrated in FIG. 3(*a*) to FIG. 3(*c*). The servo driver 10 (especially the access right control portion 102) may also perform starting/ending of the exclusive control processing (getting/releasing of the access right) as described below.

That is, in the servo driver 10, when the acquisition portion 101 acquires the predetermined control command corresponding to the processing performed by the motor control portion 104 for a specified period of time, the access right control portion 102 ends the excluding action.

According to the structure, the access right control portion 102 ends the excluding action when the acquisition portion 101 acquires the predetermined control command corresponding to the processing performed by the motor control portion 104 for a specified period of time.

Therefore, the servo driver 10 produces the following effect: the excluding action can be ended when the predetermined control command corresponding to the processing being performed is acquired for a specified period of time.

For example, in the case that an event such as "a cable connected to the upper communication portion 110 or the tool communication portion 120 is disconnected" or "a personal computer used as the first support tool 50 or the second support tool 70 is locked or powered off", the access right control portion 102 of the servo drive 10 can release the access right without receiving the "access right release" command.

That is, the access right control portion 102 can end the excluding action performed through the access right get command, for example, when the acquisition portion 101 acquires the access right get command for a specified period of time.

The implementation method of the excluding action (processing related to getting/releasing of the access right) of the servo driver 10 (especially the access right control portion 102) is not limited to the one that has been described so far. In the following, for the implementation method of the excluding action of the servo driver 10, an example of a method other than the method that has been described so far is described.

(Other Embodiments of the Exclusive Control Processing)

The servo driver 10 (especially the access right control portion 102) may also perform the excluding action according to a driving status of the motor 20. Specifically, the servo driver 10 (especially the access right control portion 102) may also perform the excluding action according to servo ON/OFF. Moreover, the servo driver 10 (especially the access right control portion 102) may also perform the excluding action according to whether the motor 20 is in a stop status. Then, the servo driver 10 (especially the access right control portion 102) may also perform the excluding action according to whether a driving speed of the motor 20 is less than a specified value. Details are described below.

(Execution of Exclusive Control Processing Corresponding to Servo ON/OFF)

In the servo driver 10, the access right control portion 102 performs an excluding action when the acquisition portion 101 acquires the predetermined control command via one of the interfaces in a status that the device does not power on the motor 20 (i.e., servo OFF), and the excluding action limits the motor control portion 104 to perform processing corresponding to the other control commands acquired by the acquisition portion 101 from the other interfaces subsequently.

According to the structure, the access right control portion 102 performs an excluding action when the acquisition portion 101 acquires the predetermined control command via one of the interfaces in a status that the device does not power on the motor 20, and the excluding action limits the motor control portion 104 to perform processing corresponding to the other control commands acquired by the acquisition portion 101 from the other interfaces subsequently.

Therefore, the servo driver 10 produces the following effect: execution of processing corresponding to the other control commands acquired from the other interfaces subsequently can be limited when the predetermined control command is acquired via one of the interfaces in a status that the device does not power on the motor 20. That is, the servo driver 10 produces the following effect: whether it is necessary to perform an excluding action is determined according to whether the motor 20 is during power-on (servo ON) or (servo OFF). Specifically, the excluding action can be performed when the motor 20 is not powered on (servo OFF).

Herein, when the motor is during power-on (servo ON), the motor 20 is in a status of being actually driven or a preliminary action status of to be actually driven, or in a status that it may not rotate even if a shaft is rotated with hands. Therefore, the following effect is produced: in "a status that the motor is not during power-on", that is, in a status (that is, a status that the motor will rotate if a shaft is rotated with hands) that the motor 20 is not driven (or a preliminary action status of not to be driven), an excluding action can be performed when a control command is acquired from one of the interfaces, and the excluding action excludes execution of processing corresponding to the control commands from the other interfaces.

In addition, acknowledgment is made for the sake of caution, and servo ON is not necessary for the access right control portion 102, that is, it is unnecessary to set power-on of the motor 20 as a trigger of an excluding action.

(Execution of Exclusive Control Processing Corresponding to Whether the Motor 20 is in a Stop Status)

In the servo driver 10, the access right control portion 102 performs an excluding action when the acquisition portion 101 acquires the predetermined control command via one of the interfaces in a status that the driving of the motor 20 stops, and the excluding action limits the motor control portion 104 to perform processing corresponding to the other control commands acquired by the acquisition portion 101 from the other interfaces subsequently.

According to the structure, the access right control portion 102 performs an excluding action when the acquisition portion 101 acquires the predetermined control command via one of the interfaces in a status that the driving of the motor 20 stops, and the excluding action limits the motor control portion 104 to perform processing corresponding to the other control commands acquired by the acquisition portion 101 from the other interfaces subsequently.

Therefore, the servo driver 0 produces the following effect: execution of processing corresponding to the other control commands acquired from the other interfaces subsequently can be limited when the predetermined control command is acquired via one of the interfaces in a status that the driving of the motor 20 stops. That is, the servo driver 0 produces the following effect: although the motor is during power-on, when the motor 20 is in a stop status, processing corresponding to the control command acquired via one of the interfaces can be performed, and execution of processing corresponding to the other control commands acquired from the other interfaces can be performed at the same time.

That is, the access right control portion 102, for example, will perform an excluding action on a condition that an invert actuates the motor 20, which thus can prevent the behavior of the motor 20 from becoming unstable and can also make desired control over the motor 20.

(Execution of Exclusive Control Processing Corresponding to Whether the Driving Speed of the Motor 20 is Less than a Specified Value)

In the servo driver 10, the access right control portion 102 performs an excluding action when the acquisition portion 101 acquires the predetermined control command via one of the interfaces in a status that a driving speed of the motor 20 is less than a specified value, and the excluding action limits the motor control portion 104 to perform processing corresponding to the other control commands acquired by the acquisition portion 101 from the other interfaces subsequently.

According to the structure, the access right control portion 102 performs an excluding action when the acquisition portion 101 acquires the predetermined control command via one of the interfaces in a status that a driving speed of the motor 20 is less than a specified value, and the excluding action limits the motor control portion 104 to perform processing corresponding to the other control commands acquired by the acquisition portion 101 from the other interfaces subsequently.

Therefore, the servo driver 10 produces the following effect: execution of processing corresponding to the other control commands acquired from the other interfaces subsequently can be limited when the predetermined control command is acquired via one of the interfaces in a status that a driving speed of the motor 20 is less than a specified value.

The servo driver 10, for example, can also set the driving of the motor 20 as a specific status (e.g., a status that the driving speed of the motor 20 is less than a specified value), so as to perform the excluding action.

(Regarding a Display Function)

Figure 6A:
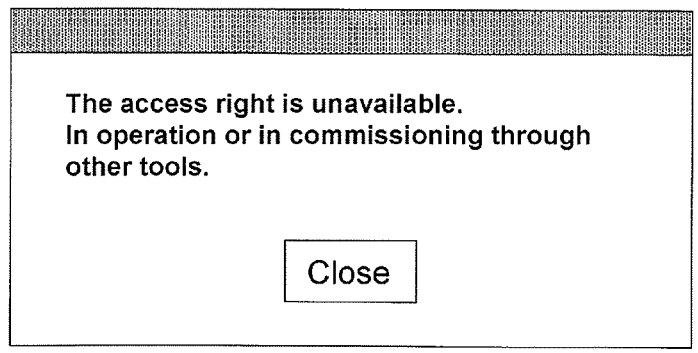
FIG. 6(a) and FIG. 6(b) are diagrams of an example of information notifying a user about an execution result of exclusive control processing performed by the servo driver in FIG. 1.
Figure 6B:
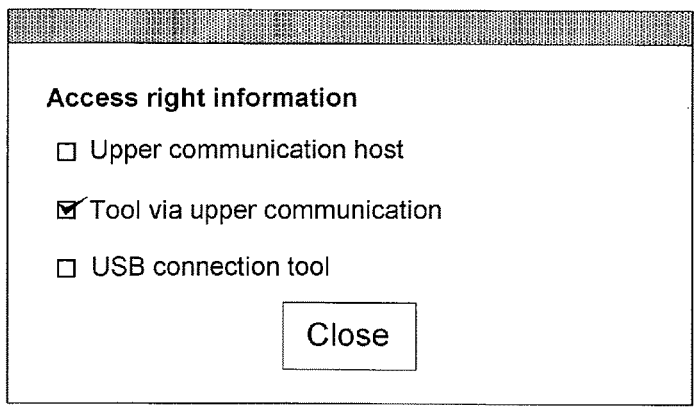

FIG. 6(*a*) and FIG. 6(*b*) are diagrams of an example of information notifying a user about an execution result of exclusive control processing performed by the servo driver 10. The servo driver 10 displays information of an execution result of the exclusive control processing performed in at least one of the device, the first support tool 50 and the second support tool 70, so as to notify a user about the execution result of the exclusive control processing.

That is, the notification portion 105 of the servo driver 10 displays information of an execution result of the exclusive control processing performed by the access right control portion 102 in at least one of the device, the first support tool 50 and the second support tool 70.

The notification portion 105, as shown in FIG. 6(*a*), displays information such as "an access right is unavailable. In operator or in commissioning through other tools" in at least one of the device, the first support tool 50 and the second support tool 70.

Moreover, the notification portion 105, as shown in FIG. 6(*b*), displays "which of the first support tool 50, the PLC 60 and the second support tool 70 gets an access right" as access right information in at least one of the device, the first support tool 50 and the second support tool 70. FIG. 6(*b*) indicates an example of a status that an access right is got "via an upper communication tool", i.e., the second support tool 70.

The notification portion 105 displays, for a control command accepted by the first support tool 50 from a user, whether it becomes an object of the exclusive control processing performed by the access right control portion 102, specifically, displays whether the PLC 60 or the second support tool 70 gets an access right.

Moreover, the notification portion 105 displays, for a control command accepted by the second support tool 70 from a user, whether it becomes an object of the exclusive control processing performed by the access right control portion 102, specifically, displays whether the PLC 60 or the first support tool 50 gets an access right.

The notification portion 105 displays information relates to where the access right is (which of the first support tool 50, the PLC 60 and the second support tool 70 gets an access right), and thus the user can grasp a get (release) status of the access right.

As described above, the servo driver 10 includes a notification portion 105, the notification portion 105 notifies a user about at least one of information indicating that the excluding action has been performed and information related to an acquisition source of the control instruction corresponding to the processing performed by the motor control portion 104 when the access right control portion 102 performs the excluding action.

According to the structure, the notification portion notifies a user about at least one of information indicating that the excluding action has been performed and information related to an acquisition source of the control instruction corresponding to the processing performed by the motor control portion 104 when the access right control portion 102 performs the excluding action.

Therefore, the servo driver 10 produces the following effect: a user can be notified about at least one of information indicating that the excluding action has been performed and information related to an acquisition source of the control instruction corresponding to the processing performed when the excluding action is performed.

(Embodiment by Means of Software)

Figure 7:
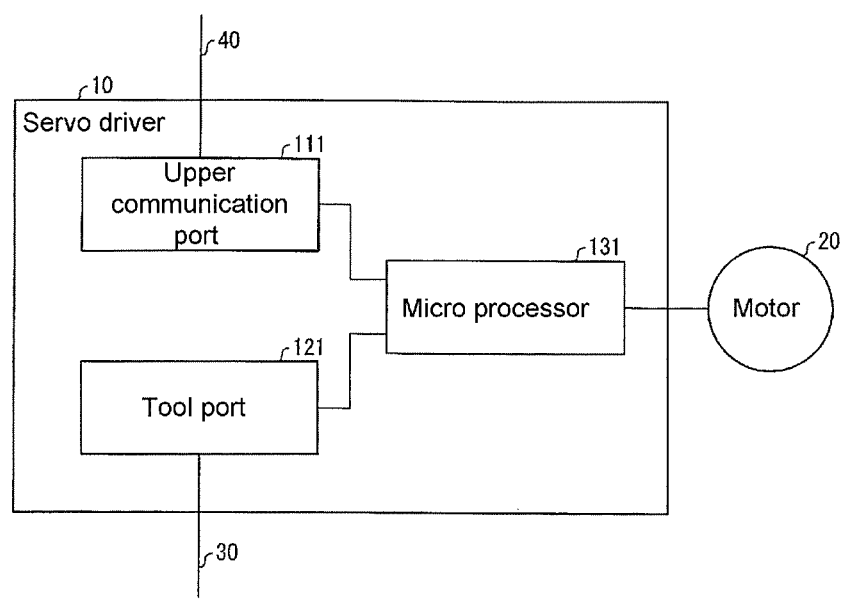
FIG. 7 is a structural block diagram of main parts of a computer that can be exemplarily used as the servo driver in FIG. 1.

FIG. 7 is a structural block diagram of main parts of a computer that can be exemplarily used as the servo driver 10.

Control portions 100 of the servo drier 10 (especially the acquisition portion 101, the access right control portion 102, the commissioning instruction portion 103, the motor control portion 104 and the notification portion 105) can be implemented by a logic circuit (hardware) formed on an integrated circuit (IC chip) or the like, and may also be implemented by software by using a central processing unit (CPU). For example, the control portions 100 may be implemented through a micro-processor shown in FIG. 7.

In the latter situation, the servo driver 10 includes a CPU (or micro-processor 131) that executes a command of software, i.e., program, which implements various functions, a read only memory (ROM) or storage devices (which are referred to as "recording medium") recording the program and various data that can be read by a computer (or CPU or micro-processor 131), and a random access memory (RAM) expanding the program, etc. Moreover, the objective of the present invention is achieved by reading and executing the program from the recording medium by the computer (or CPU). As the recording medium, "non-temporary tangible medium" may be used, for example, a tape, a disk, a card, a semiconductor memory, a programmable logic circuit and the like can be used. Moreover, the program may also be provided to the computer via any transmission medium (communication networks or broadcast waves, etc.) that can transmit the program. In addition, the present invention can also be implemented in the form of data signals instantiating the program and embedded into carriers through electronic transmission.

Moreover, the upper communication portion 110 of the servo driver 10 may also be implemented through an upper communication port 111. The upper communication portion 110, for example, includes: a field bus control portion that manages data transmission via a field network 40; a field bus receiving portion that receives an upper communication frame sent from a PLC 60 via the field network 40 which is output to the field bus control portion after being decoded into data; and a field bus sending portion that regenerates an upper communication frame from the data output from the field bus control portion, and resends (forwards) the upper communication frame via the field network 40. The field bus control portion cooperates with the field bus receiving portion and the field bus sending portion to transmit and receive data between it and the PLC 60 within each predetermined control cycle via the field network 40.

Then, the tool communication portion 120 of the servo driver 10 may also be implemented through a tool port 121. The tool port 121, for example, is a USB connector, and is an interface for connecting the servo driver 10 with the first support tool 50. Typically, the control command from the first support tool 50 is imported to the servo driver 10 via the USB connector, i.e., the tool communication portion 120, and is performed by the micro-processor 131.

The present invention is not limited to the various implementations, various changes can be made within the scope indicated in the claims, and implementations obtained by properly combining technical components disclosed in different implementations respectively are also included in the technical scope of the present invention.

What is claimed is:

1. A motor driver, comprising:
   multiple interfaces, receiving control commands through a non-real-time communication and a real-time communication, wherein the real-time communication is a cyclic communication that uses a process data object protocol to exchange data at a fixed cycle, and the non-real-time communication is a communication that uses a service data object protocol to exchange data at any timing; and
   a control portion, comprising:
      an acquisition portion acquiring the control commands via the multiple interfaces respectively, wherein the control commands comprise a first control command for controlling driving of a motor acquired through the non-real time communication via one of the interfaces and a second control command acquired through the real-time communication via an other one of the interfaces;
      a command processing portion, configured to perform processing of the control commands; and
      an exclusive limiting portion, configured to:
      perform an excluding action to stop transmitting the second control command acquired through the real-time communication to the command processing portion during a period when the first control command acquired through the non-real-time communication for controlling driving of the motor is being performed by the command processing portion in response to determining that the second control command comprises a command for controlling driving of the motor, and
      transmit the second control command acquired through the real-time communication to the command processing portion during the period when the first control command acquired through the non-real-time communication for controlling driving of the motor is being performed by the command processing portion in response to determining that the second control does not comprise the command for controlling driving of the motor, wherein the command processing portion executes the control commands transmitted from the exclusive limiting portion to control the motor.

2. The motor driver according to claim 1, wherein the multiple interfaces comprise:
a first communication interface, wherein the first communication interface inputs the control commands from an upper controller, and the upper controller is the external apparatus communicably connected with a device via a network; and
a second communication interface, wherein the second communication interface inputs the control commands from an external device as the external apparatus not connected to the network,
the acquisition portion acquires the control commands through the non-real-time communication via at least one of the first communication interface and the second communication interface.

3. The motor driver according to claim 2, wherein the acquisition portion distinguishes the control commands acquired via the first communication interface from the control commands acquired via the second communication interface.

4. The motor driver according to claim 1, wherein the first control command of the processing performed by the command processing portion comprises a command of causing the exclusive limiting portion to start the excluding action and a command of causing the exclusive limiting portion to end the excluding action,
the exclusive limiting portion starts the excluding action when the acquisition portion acquires the command of causing the exclusive limiting portion to start the excluding action comprised in the first control command, and
the exclusive limiting portion ends the excluding action when the acquisition portion acquires the command of causing the exclusive limiting portion to end the excluding action comprised in the first control command.

5. The motor driver according to claim 1, wherein the exclusive limiting portion ends the excluding action when the acquisition portion acquires the first control command of the processing performed by the command processing portion for a specified period of time.

6. The motor driver according to claim 1, wherein the exclusive limiting portion performs an excluding action when the acquisition portion acquires the first control command via the one of the interfaces in a status that a device does not power on the motor, the excluding action limits the command processing portion to perform processing of second control command acquired by the acquisition portion from the other one of the interfaces subsequently.

7. The motor driver according to claim 1, wherein the exclusive limiting portion performs an excluding action when the acquisition portion acquires the first control command via the one of the interfaces in a status that the driving of the motor stops, the excluding action limits the command processing portion to perform processing of the second control command acquired by the acquisition portion from the other one of the interfaces subsequently.

8. The motor driver according to claim 1, wherein the exclusive limiting portion performs an excluding action when the acquisition portion acquires the first control command via the one of the interfaces in a status that a driving speed of the motor is less than a specified value, the excluding action limits the command processing portion to perform processing of the second control commands acquired by the acquisition portion from the other one of the interfaces subsequently.

9. The motor driver according to claim 1, further comprising:
a notification portion that notifies a user about at least one of information indicating that the excluding action has been performed and information related to an acquisition source of the control commands of the processing performed by the command processing portion.

10. A method of data signalling control, wherein the method comprising:
an acquisition step of acquiring control commands through a non-real-time communication and a real-time communication via the multiple interfaces, wherein the real-time communication is a cyclic communication that uses a process data object protocol to exchange data at a fixed cycle, the non-real-time communication is a communication that uses a service data object protocol to exchange data at any timing, and the control commands comprise a first control command for controlling driving of a motor acquired through the non-real time communication via one of the interfaces and a second control commands acquired through the real-time communication via an other one of the interfaces;
a command processing step of performing processing of the control commands; and
an exclusive limiting step of performing an excluding action to stop transmitting the second control command acquired through the real-time communication during a period when the first control command acquired through the non-real-time communication for controlling driving of the motor is being performed by the command processing portion in response to determining that the second control command comprises the command of controlling driving of the motor, and
transmitting the second control command during the period when the first control command for controlling driving of the motor is being performed by the command processing portion in response to determining that at least one of the first control command and the second control command does not comprise the command of controlling driving of the motor; and
executing the transmitted control commands to control the motor.

11. A non-transitory computer-readable recording medium storing an information processing program, for causing a computer to perform the control method according to claim 10.

* * * * *